United States Patent [19]
Jenkins et al.

[11] Patent Number: 6,099,033

[45] Date of Patent: Aug. 8, 2000

[54] COMPRESSED AIR BAG INFLATOR

[75] Inventors: Jeffrey A. Jenkins, Shelby Township; John W. Wiers, Romeo; Norman A. Ellsworth, Romeo; William R. Buchanan, Romeo; Stanley B. Good, Columbus; Timothy D. Slack, Troy, all of Mich.

[73] Assignee: MST Automotive of America, Sterling Heights, Mich.

[21] Appl. No.: 09/065,535

[22] Filed: Apr. 24, 1998

Related U.S. Application Data

[62] Division of application No. 08/646,061, May 7, 1996, Pat. No. 5,787,563.

[51] Int. Cl.[7] .......................... B60R 21/22; B60R 21/28; B67D 5/00
[52] U.S. Cl. ............................... 280/737; 280/741; 222/3
[58] Field of Search ...................... 280/741, 736, 280/728.1, 737; 102/530, 531; 222/3; 29/417; 228/177, 189

[56] References Cited

U.S. PATENT DOCUMENTS

| | | |
|---|---|---|
| 3,546,413 | 12/1970 | Ishizuka . |
| 3,784,779 | 1/1974 | Schaitberger . |
| 4,769,901 | 9/1988 | Nagahori . |
| 5,094,475 | 3/1992 | Olsson et al. . |
| 5,113,577 | 5/1992 | Wildgen . |
| 5,184,846 | 2/1993 | Goetz . |
| 5,196,669 | 3/1993 | Rchardson . |
| 5,263,740 | 11/1993 | Frey et al. . |
| 5,335,940 | 8/1994 | Cuevas . |
| 5,344,186 | 9/1994 | Bergerson et al. . |
| 5,348,344 | 9/1994 | Blumenthal et al. . |
| 5,351,988 | 10/1994 | Bishop et al. . |

(List continued on next page.)

FOREIGN PATENT DOCUMENTS 0 512 747  11/1992  European Pat. Off. .

OTHER PUBLICATIONS

Johnson et al., High Speed Pulse Welding of Powder Metalurgy Automotive Components, International Congress and Exposition, Detroit, MI, Feb. 27–Mar. 2, 1995.

Stahli et al., Metallographic Aspects of Impulse Welding, Jom, vol. 38, No. 5, May 1986, pp. 43–46.

Kniat et al., Capacity Discharge High Energy Pulse Welding (A New Concept in Welding).

Schlemmer, Special Welding Machines.

*Primary Examiner*—Lanna Mai
*Assistant Examiner*—Jeff Restifo
*Attorney, Agent, or Firm*—Pillsbury Madison & Sutro LLP

[57] ABSTRACT

An airbag inflator assembly is disclosed that includes a container containing a charge of pressurized gas and having a peripheral surface surrounding an opening in the container. A burst disc member has one side capacitive discharge welded to the peripheral surface of the container to seal the opening and thus confine the pressurized gas within the container. An ignitor assembly includes an ignitor assembly housing and ignition elements constructed and arranged to generate sufficient force to break the seal formed by the burst disc member and release the pressurized gas from the container. The ignitor elements are disposed substantially within the ignitor assembly housing. The ignitor assembly housing is an integrally formed unitary construction capacitive discharge welded to a side of the burst disc member opposite to the one side. In a preferred embodiment, the welds are formed by (1) applying a force to urge i) the first side of the burst disc member into engagement with the peripheral surface of the container and ii) the peripheral surface of the ignitor assembly housing into engagement with the second side of the burst disc member. Also, pulses of electrical discharge are applied i) in a vicinity of the forceable engagement between the first side of the burst disc member and the peripheral surface of the container until welded to one another, and ii) in a vicinity of the forceable engagement between the peripheral surface of the ignitor assembly housing and the second side of the burst disc member until welded to one another.

4 Claims, 4 Drawing Sheet

U.S. PATENT DOCUMENTS

| | | |
|---|---|---|
| 5,378,018 | 1/1995 | Ketterer et al. . |
| 5,388,322 | 2/1995 | Simon . |
| 5,421,609 | 6/1995 | Moore et al. . |
| 5,433,476 | 7/1995 | Matema et al. . |
| 5,441,302 | 8/1995 | Johnson et al. . |
| 5,451,381 | 9/1995 | Kishimoto et al. . |
| 5,454,592 | 10/1995 | Blumenthal et al. .................. 280/737 |
| 5,456,492 | 10/1995 | Smith et al. . |
| 5,462,307 | 10/1995 | Webber et al. . |
| 5,464,247 | 11/1995 | Rizzi et al. . |
| 5,468,015 | 11/1995 | Goetz . |
| 5,474,328 | 12/1995 | Nilsson . |
| 5,496,062 | 3/1996 | Rink et al. . |
| 5,542,702 | 8/1996 | Green et al. . |
| 5,570,904 | 11/1996 | Cuevas . |
| 5,670,738 | 9/1997 | Storey et al. ........................... 280/737 |
| 5,720,495 | 2/1998 | Faigle et al. ........................... 280/737 |
| 5,803,493 | 9/1998 | Paxton et al. .......................... 280/737 |

COMPRESSED AIR BAG INFLATOR

This application is a division of Ser. No. 08/646,061, filed May 7, 1996 now U.S. Pat. No. 5,787,563.

BACKGROUND OF THE INVENTION

The present invention relates to airbag assemblies, and in particular, to a method of manufacturing inflator assemblies used in airbag assemblies.

It is known in the automotive industry to provide an airbag assembly which inflates upon a motor vehicle collision to protect the passengers within the motor vehicle. The airbag assembly includes a bag member that is normally folded and stored until deployment and an airbag inflator assembly that provides gas under pressure into the bag member to inflate the same during the collision.

Typically, the compressed gas airbag inflator assembly includes a container or bottle for containing compressed gas, a burst disc member for sealing an opening in the container, and an ignitor assembly for generating a force or momentum to burst the burst disc member and thus release the compressed gas from the bottle. The inflator assembly is conventionally assembled in two or more welding procedures. In one procedure, a first side of the burst disc member is welded to a peripheral surface surrounding the opening in the container so that the burst disc is sealed over the opening. In a subsequent procedure, an opposite side of the burst disc member is welded to the housing of the ignitor assembly.

The welding methods heretofore used to weld the burst disc to the container include welding technologies such as tig welds, mig welds, laser welds, friction welds, and electron beam welds. While these technologies have proven to be adequate in accomplishing the desired welded connections, they are unwieldy slow, and/or problematic in that they generate a significant amount of heat that may compromise the integrity of the burst disc member. The burst disc member is typically in the form of a thin metallic disc, having a thickness of only about 0.010"–0.050", and may be compromised by the heat levels utilized during the faster welding processes if some other accommodations are not made. For example, in order to dissipate heat during the welding process, a relatively substantial thermal mass, such as a relatively thick annular metallic ring, may be integrally formed or, otherwise, thermally connected to the ignitor assembly housing or the periphery of the burst disc member before the burst disc member and ignitor assembly housing are welded. Providing this accommodation, of course, adds to the complexity and material cost of manufacturing the entire inflator assembly.

For example, where a separate annular ring is welded between the burst disc and the ignitor assembly housing, an additional welding step is required, and additional material costs are associated with the annular ring stamping. On the other hand, where an annular ring is integrally formed with the burst disc or ignitor assembly housing, the parts must be machined and cannot be stamped in a cost-effective manner. In addition, the additional material for providing the integrally formed thickened portion remains.

It is an object of the present invention to eliminate the disadvantages associated with providing this accommodation. In accordance with this object, the present invention provides an airbag inflator assembly comprising a container, a burst disc member, and an ignitor assembly. The container contains a charge of pressurized gas and has peripheral surface surrounding an opening in the container. The burst disc member has one side welded to the peripheral surface of the container so as to seal the opening and thus confine the charge of pressurized gas within the container. The ignitor assembly includes an ignitor assembly housing and ignition elements constructed and arranged to generate sufficient force to break the seal formed by the burst disc member and release the pressurized gas from the container. The ignition elements are secured to the inflator assembly by the ignitor assembly housing. The ignitor assembly housing is an integrally formed unitary construction welded to a side of the burst disc member opposite the one side.

Another problem associated with conventional techniques of manufacturing the inflator assembly relates to the manner in which the container is pressurized with gas. Conventionally, the burst disc and ignitor assembly are welded in place over a major opening in the container, and the container is pressurized through a smaller diameter opening spaced from the major opening. After the container is pressurized, a small plug or bead is placed over the smaller opening and welded in place, with the gas pressure effectively sealed within the container. This conventional method is time consuming and cumbersome.

It is an object of the present invention to provide a method of manufacturing an airbag inflator assembly which overcomes the difficulties noted above. In accordance with this object, the present invention provides a method of manufacturing an airbag inflator assembly comprising a container constructed and arranged to contain pressurized gas and having an opening defined by a peripheral surface surrounding the opening, a burst disc member constructed and arranged to form a seal with the peripheral surface to seal the opening, and an ignitor assembly constructed and arranged to generate sufficient force to break the seal formed by the burst disc member. The method comprising placing the container, the burst disc member, and a housing for the ignitor assembly in a chamber; pressurizing the chamber to an appropriate pressure based upon a desired pressure to be contained within the container of the airbag inflator assembly; applying force i) to urge a surface portion on one side of the burst disc member and the peripheral surface surrounding the opening in the container into forcible engagement with one another, and ii) to urge a surface portion on an opposite side of the burst disc member and an associated surface portion of the ignitor assembly housing into forcible engagement with one another; applying pulses of electrical discharge i) in the vicinity of the forcible engagement between the surface portion on one side of the burst disc member and the peripheral surface surrounding the opening in the container so that the surface portion on one side of the burst disc member and the peripheral surface surrounding the opening in the container are sealingly welded to one another so that the desired pressure is contained within the container, and 2) in the vicinity of the forcible engagement between the surface portion on the opposite side of the burst disc member and the associated surface portion of the ignitor assembly housing so that the surface portion on the opposite side of the burst disc member and the associated surface portion of the ignitor assembly housing are welded to one another.

These and other objects of the present invention will become more apparent during the course of the following detailed description and appended claims. The invention may be best understood with reference to the accompanying drawings, wherein illustrative embodiments are shown.

DETAILED DESCRIPTION OF THE DRAWINGS

Figure 1:
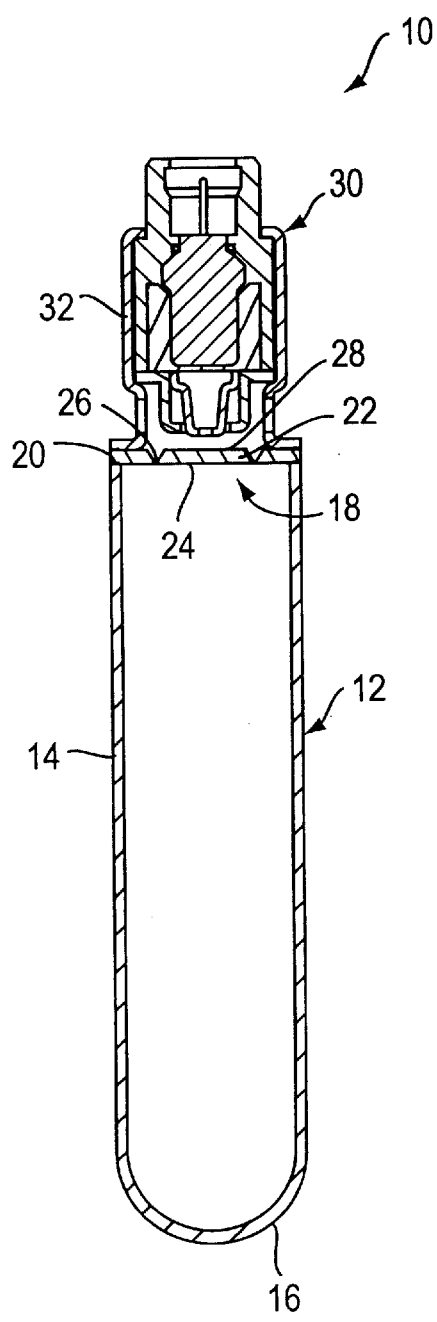
FIG. 1 is a longitudinal sectional view of an airbag inflator assembly manufactured in accordance with the principles of the present invention.

Shown in FIG. 1 is a longitudinal sectional view of an airbag inflator assembly, generally indicated at 10, manufactured in accordance with the principles of the present invention. The inflator assembly comprises a tubular bottle or container, generally indicated at 12. The container 12 has a tubular cylindrical wall portion 14 closed off at one end by a hemispherical portion 16 integrally formed therewith, and an opposite end terminating in an opening 18. A peripheral surface or edge 20 at the end of the cylindrical wall portion 14 defines the opening 18. The container 12 is preferably made from a low carbon steel in a forging manufacturing operation.

Inflator assembly 10 further includes a burst disc member, generally indicated at 22. The burst disc member 22 is in the form of a circular disc surface 24 on one side thereof weldedly sealed along its periphery to the peripheral surface 20 defining the opening 18 of the inflator assembly. In this fashion, the burst disc member 22 seals the opening 18 so as to contain pressurized gas within the container 12. In the preferred embodiment the burst disc member 22 has a thinned or weakened portion in the form of a circular groove 26 formed in the surface 28 opposite the surface 24. It should be appreciated that other shaped grooves, such as cross-shaped grooves, can be used. Alternatively, no grooves can be provided, so long as the burst disc is capable of being fractured or conditioned to permit the pressurized gas within the containers to escape at the appropriate time. Preferably, the burst disc member 22 is formed in a stamping operation from inconel or a low carbon steel, and preferably has a thickness in the groove 26 of approximately between 0.010"–0.050", depending upon the amount of pressure which is to be contained within the container.

Figure 2:
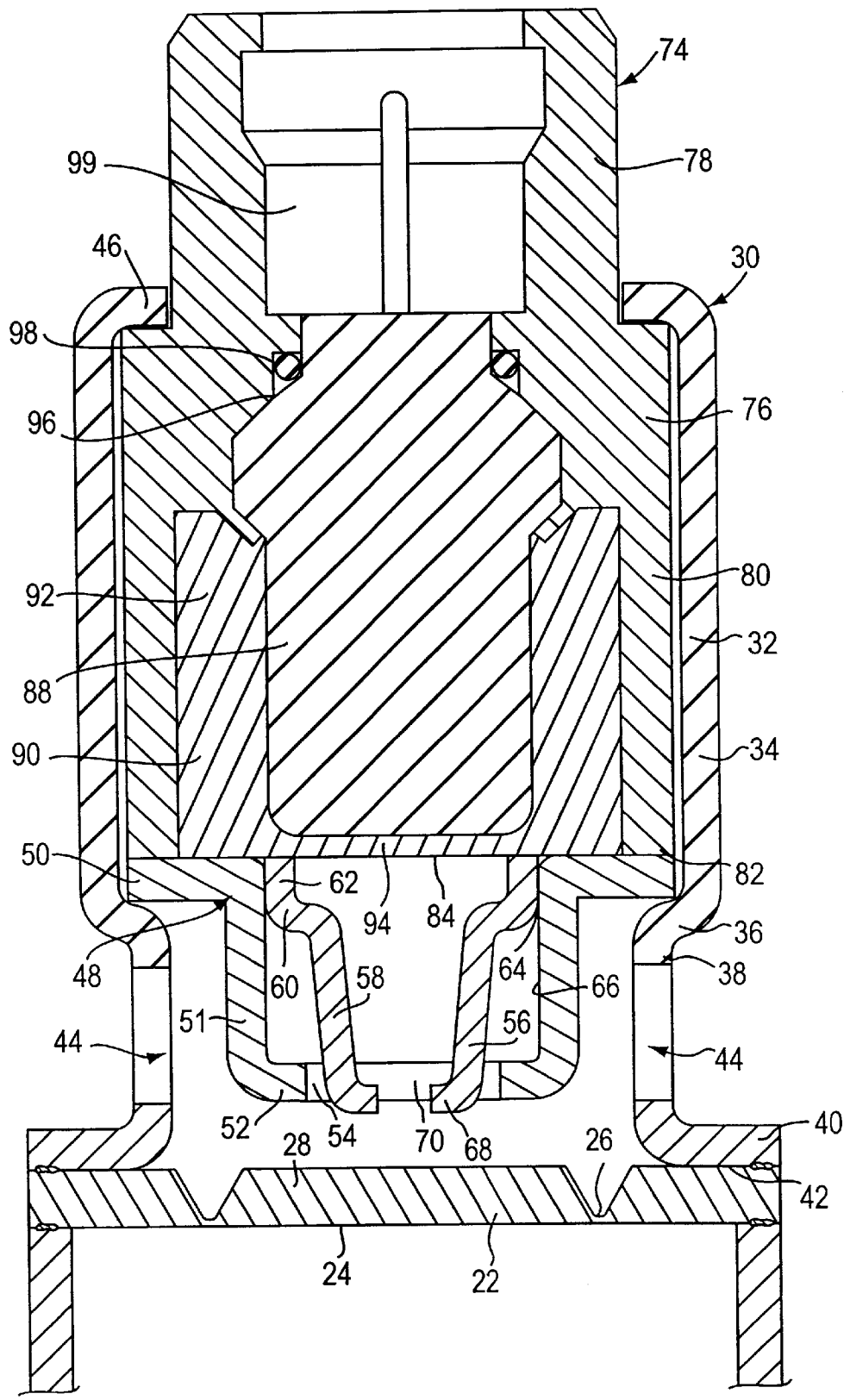
FIG. 2 is an enlarged longitudinal sectional view of the ignitor assembly portion of the airbag inflator assembly manufactured in accordance with the principles of the present invention.

As seen most clearly in FIG. 2, the inflator assembly 10 further includes an ignitor assembly, generally indicated at 30. The ignitor assembly includes an integrally formed, one-piece or unitary outer housing 32 of generally tubular construction. The outer housing 32 has a generally cylindrical main portion 34, a radially inwardly extending portion 36 extending from the cylindrical portion 34 to a cylindrical narrowed diameter portion 38. The outer housing 32 then preferably terminates in an outwardly flared flange 40, which extends radially outwardly from the narrowed diameter portion 38, and which provides an annular surface 42 that is constructed and arranged to engage and be welded to the outer periphery of the surface 28 of burst disc member 22. The weld between the annular surface 42 of the flange 40 with the outer periphery of the surface 28 of the burst disc member 22 operates to secure the entire ignitor assembly 30 to the burst disc member 22. Because the welding operation in accordance with the present invention generates insignificant amounts of heat, as will be described more fully later, the outer housing can be welded directly to the surface 28 of the burst disc member 22, without any further accommodation. It can also be appreciated that the housing has a generally thin, constant wall thickness generally throughout its extent, and need not be designed heavier or thicker in the area thereof to be welded to the burst disc in order to dissipate heat.

The outer housing 32 has a plurality of circumferentially spaced openings 44 disposed along the narrowed diameter portion 38. An end 46 of the outer housing 32, which extends from an end of the cylindrical portion 34 opposite that connected with the narrowed diameter portion 38, extends radially inwardly in a crimped fashion to retain the inner components of the ignitor assembly 30 within the outer housing 32.

Figure 6:
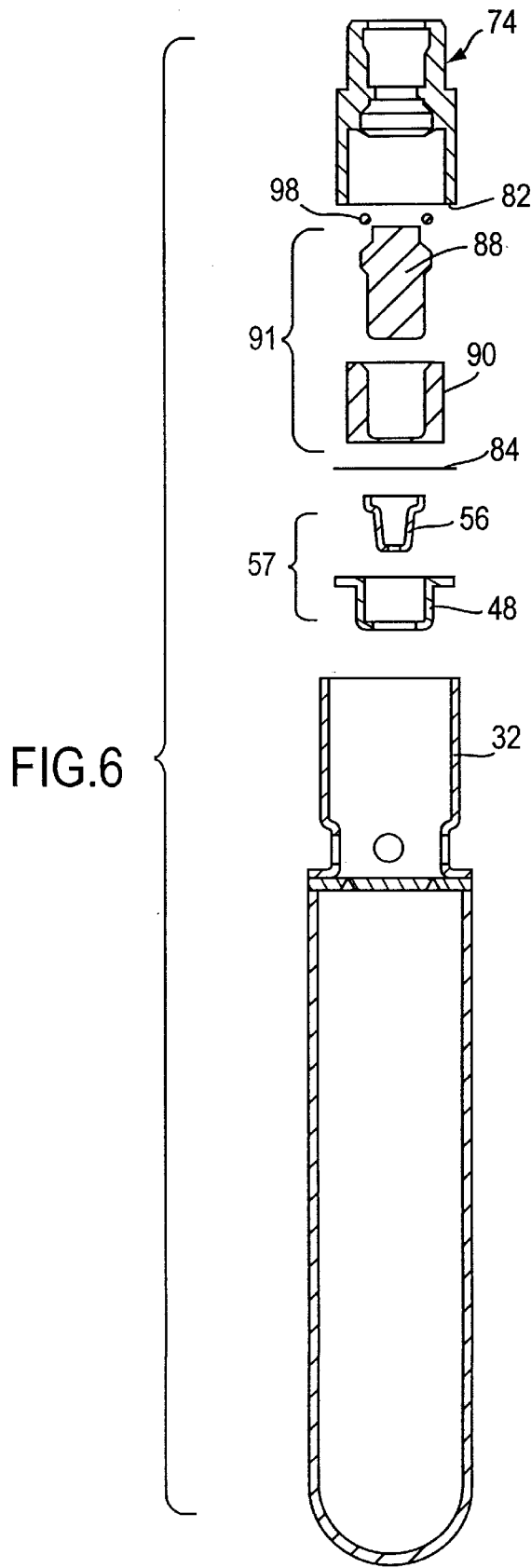
FIG. 6 is a longitudinal sectional view of the airbag inflator assembly manufactured in accordance with the method of the present invention, and showing various elements of the inflator assembly which are to be mounted onto the components assembled in accordance with FIGS. 2–4.

The outer housing 32 is also preferably made from a low carbon steel tubing, which is cut to length and then roll-formed into the shape generally shown in FIG. 6. Because the housing 32 need not be machined, it can be manufactured cost-effectively.

Referring back to FIG. 2, it can be seen that the outer housing 32 contains a piston housing 48 having a top-hat cross-sectional configuration (inverted in the orientation shown in the Figures). The piston housing 48 has an annular brim or flange portion 50 extending radially outwardly from one end of a cylindrical wall portion 51 thereof. The end of the cylindrical wall portion 51 opposite that connected with the flange 50 terminates in a radially inwardly extending shoulder 52 defining an opening 54 in the top part of the top-hat configuration. The outer periphery of the flange portion 50 engages the inner surface of the radially inwardly extending portion 36 of the outer housing 34. The piston housing 48 is arranged within the outer housing 32 such that the opening 54 of the piston housing is presented in adjacent relation to the central portion of the burst disc member 22 as defined by the groove 26.

A generally frusto-conical piston 56 is held within the cylindrical body portion of the piston housing 48. The piston 56 and piston housing 48 together constitute a piston assembly 57 (see FIG. 6). As shown, the piston 56 has a generally tubular configuration, with a frusto-conical main wall portion 58. Towards the base or larger diameter portion of the main wall portion 58, the piston 56 expands radially outwardly at a radially extending shoulder portion 60, and terminates in a longitudinally extending, generally cylindrical wall portion 62. The exterior cylindrical surface 64 of the cylindrical wall portion 62 engages the inner surface 66 of the piston housing's cylindrical wall portion 51. The apex or narrower diameter portion of the frusto-conical main wall 58 terminates in a radially inwardly extending portion 68, which defines a central opening 70. The radially inwardly extending portion 68 protrudes slightly beyond the opening 54 defined by the flange 52 of the piston housing 48. The frictional engagement between the outer surface 64 of the cylindrical wall portion 62 of the piston 56 and the inner surface 66 of the piston housing 48 maintains the piston 56 in the relative position shown in FIG. 2, spaced from the burst disc member 22, prior to ignition of the ignitor assembly 30. Preferably, the piston 56 and piston housing 32 are also made of low carbon steel.

The ignitor assembly 30 also includes a squib housing, generally indicated at 74, made of a metal, preferably steel. It is also contemplated that an especially adapted plastic can also be used. The squib housing 74 has a generally tubular construction, with a generally larger outer diameter portion 76 disposed within the outer housing 32, and a narrower diameter portion 78 extending outwardly through an opening in the outer housing 32 defined by end 46. The larger outer diameter portion 76 includes a cylindrical wall portion 80, which terminates in an annular edge 82 at an end thereof opposite the narrower diameter portion 78.

A thin, circular metal foil element, indicated at 84, has its periphery adhesively sealed to the annular edge 82. Any suitable adhesive can be used for this purpose. Preferably, the foil 84 is made of an aluminum material or mylar material.

Contained within the squib housing 74 is a squib assembly 88 and a generant 90. The squib assembly 88 and generant 90 together constitute ignition elements 91 (see FIG. 6). The particular construction of the ignitor assembly 30 is not essential, so long as it is capable of generating sufficient force to enable it to burst the burst disc member 22 at the appropriate instant. The generant is substantially cup-shaped, and has a cylindrical wall portion 92 having an outer surface which engages the interior surface of the cylindrical wall portion 80 of the squib housing. A circular wall portion 94 closes off one end of the cylindrical wall portion 92 and engages the central portions on one side of the foil 84, as shown.

The squib assembly 88 has a cylindrical portion thereof substantially contained within the confines of the cup-shaped generant 90, and an upper end portion thereof extending outwardly from the generant. The upper portion of the squib assembly 88 has an irregular outer configuration and provides an annular bearing surface 96 for engaging an O-ring 98. The O-ring 98 forms a seal between the upper portion of the squib assembly 88 and the adjacent portions of the squib housing 74, as shown. The effect of the seal provided by the O-ring between the squib assembly 88 and the squib housing 74, and the seal between the foil 84 and annular edge 82 of the squib housing 74 functions to maintain the squib assembly 88 and the generant 90 in a moisture-free environment so as to maintain the integrity of the squib assembly and generant.

While not shown, the squib assembly 88 has an outer steel housing, and contains a propellant. In addition, the generant 90 is a propellant material. When an electric current is provided to the squib assembly 88, the squib assembly generates an explosive reaction, and in conjunction with the generant 90, causes the piston 56 to be propelled with sufficient force towards the burst disc member to cause the forward end 68 to break the burst disc member along the weakened portions defined by groove 26. As a result, the pressurized gas contained within the container 12 is permitted to exit the container 12 and escape through the openings 44 provided in the outer housing 32 and into an airbag for inflation.

A connector member (not shown) is received within the remaining space 99 of the squib housing not occupied by the squib assembly 88 and generant 90. The connector receives electric wiring that feeds an electric current to the squib assembly 88 to ignite the same at the appropriate instant.

While the ignitor assembly 30 has been shown and described in accordance with the preferred embodiment, it should be appreciated that other known types of ignitor assemblies may be provided. For example, rather than providing a piston assembly in the form of a piston housing 48 and a piston 56, it is also possible to provide an air pressure piston assembly in which air pressure is used to burst the burst disk. As another example, the shear flame heat generated from the squib assembly and generant may be sufficient to burst the burst disc 22. Similarly, the particular structural configuration of the burst disc 22 and container 12 are not essential to the method of the present invention.

Figure 3:
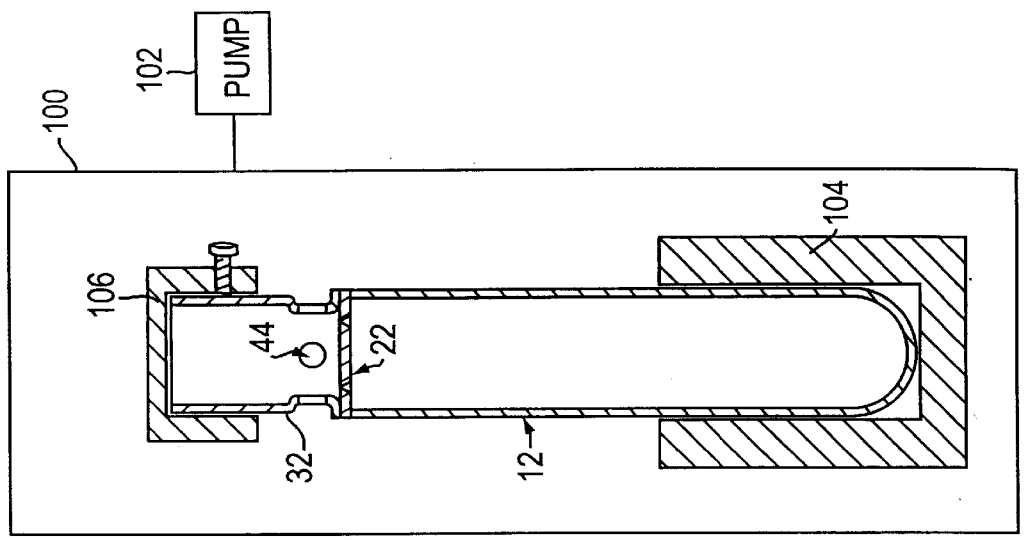
FIGS. 3, 4 and 5 are longitudinal sectional views taken through various components of the airbag inflator assembly during three different stages of the method in accordance with the present invention.

Turning now to FIG. 3, an initial step in accordance with the principles of the present invention is shown. More particularly, the container 12, the burst disc member 22, and the ignitor assembly outer housing 32 are placed within a chamber 100 capable of being pressurized by a pump 102.

While the present invention contemplates that the entire ignitor assembly 30 can be pre-assembled and placed into the chamber as a completed assembly for attachment with the burst disc member, it is preferred that only the housing 32 be placed in the chamber to be welded before the rest of the ignitor assembly components are assembled within the housing 32.

The container 12 is placed in a clamp member or holder assembly, schematically shown at 104, and the outer housing 32 is likewise held by a holder assembly, schematically shown at 106, of any suitable type. For example, as shown, the holder assembly 104 is simply of a cup-shaped configuration, which holds the container 12 by force of gravity, while the holder assembly 106 contains a screw member 108 for engaging the side surface of the outer housing 32 and securing the housing 32 to the holder 106. The burst disc member 22 may be laid to rest upon the peripheral surface 20 defining the opening 18 within the container 12, or alternatively, as shown, be suspended above the opening 18 by a movable arm assembly, schematically shown at 110. The arm assembly 110 includes a movable arm, schematically shown at 112, which is adapted to releasably hold the burst disc member 22 by any suitable means, such as by magnetism. The movable arm assembly 110 further includes a motor assembly, schematically shown at 114, for moving the arm 112. The burst disc member carried by the arm can thus be moved towards the container 12 and laid to rest on the peripheral surface 20, after which time the arm 112 can be moved away.

The purpose of providing the movable arm assembly 110 is to enable the container 12 to be pressurized with gas before the burst disc member is laid to rest on peripheral surface 20. This enables the container 12 to be pressurized without interference from a seal that might be caused by the burst disc member 22 resting upon the peripheral surface 20 of the container during pressurization of chamber 100 by pump 102. It is contemplated, however, that the entire arm assembly 110 may be unnecessary, due to the fact that the seal created between the burst disc member and the peripheral surface 20, simply as a result of the burst disc member 22 resting upon the peripheral surface 20 by the force of gravity, would not be sufficient to prevent gas from pressurizing the container 12. In this regard, it is also possible to provide the burst disc member 22 with a slight warp in its initial shape to ensure that, even with the burst disc member 22 resting upon the peripheral surface 20, the container 12 would easily be pressurized by gas pumped into the chamber 100, thus, not requiring the use of any movable arm assembly 110.

As shown in FIG. 3, in its initial condition, it is preferred to provide the annular flange surface 42 of the outer housing 32 with an annular bead or concentrator 116 to facilitate weld formation with the periphery of the burst disc member 22. Likewise, it can be seen that the peripheral surface 20 defining the opening 18 in the container 12 includes an annular bead 118 to facilitate weld formation with the opposite side 24 of the burst disc member 22. Preferably, the annular beads 116 and 118 are machined on their respective surfaces to have the same diameter as one another so that they can be aligned on opposite sides of the burst disc 22 during welding (see FIG. 4).

Figure 4:
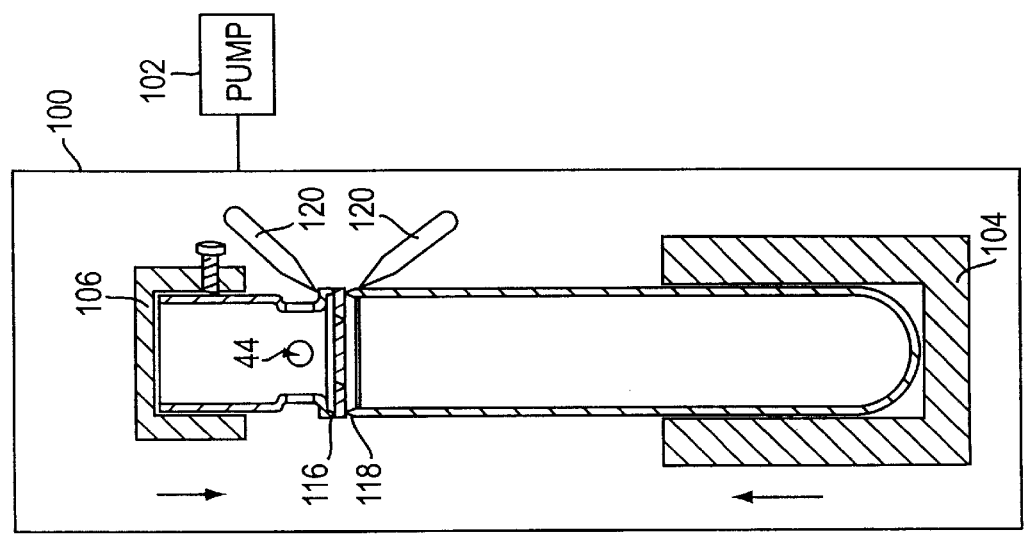

After the container is pressurized (preferably to between 2,000–4,500 PSI, depending upon the amount of pressure desired to be contained within container 12 once sealed) in accordance with FIG. 3, the holder assemblies 104 and 106 effect relative movement towards one another, as indicated by arrows in FIG. 4. As a result of this movement, the peripheral surface 20 and bead 118 of the container 12 forcibly engages the outer periphery of the surface 24 on one side of the burst disc member, and the annular surface 42 and bead 116 of the flange 40 forcibly engages the outer periphery of the surface 28 opposite the surface 24. As the holder assembly 106 and holder assembly 104 continue to apply force in the aforementioned fashion, electrodes 120 provide a series of rapid pulsed electrical discharge through the areas to be welded. More particularly, the electrical discharge travels from one electrode to another and is concentrated through the current path provided by the beads 116 and 118 so that the beads provide areas of both mechanical and electrical energy concentration to facilitate a peripheral weld formation. Such high speed discharge pulse welding while applying force or pressure between the parts to be welded is known as "capacitive discharge" welding. It is known that circumferential welds can be formed from this process, and that welding can take place as quickly as within 3–15 milliseconds, with generation of relatively insignificant amounts of heat. In addition, as shown, the weld between the container 12 and burst disc member 22, and the weld between the outer housing 32 and the burst disc member 22 can be accomplished in a single, simultaneous welding operation, known as a "sandwich" weld, as opposed to requiring two separate welding processes.

Moreover, as a result of the welding process being conducted under pressure, the container 12 is left with the required amount of compressed gas for inflating an airbag, after the welding process is completed. Preferably, the container 12 contains anywhere between 2,000–4,500 PSI, and more preferably, between 3,000–4,200 PSI. In essence, the chamber 100 is pressurized to an amount sufficient to ensure that the container 12 will be pressurized to the approximate pressure desired.

Figure 5:
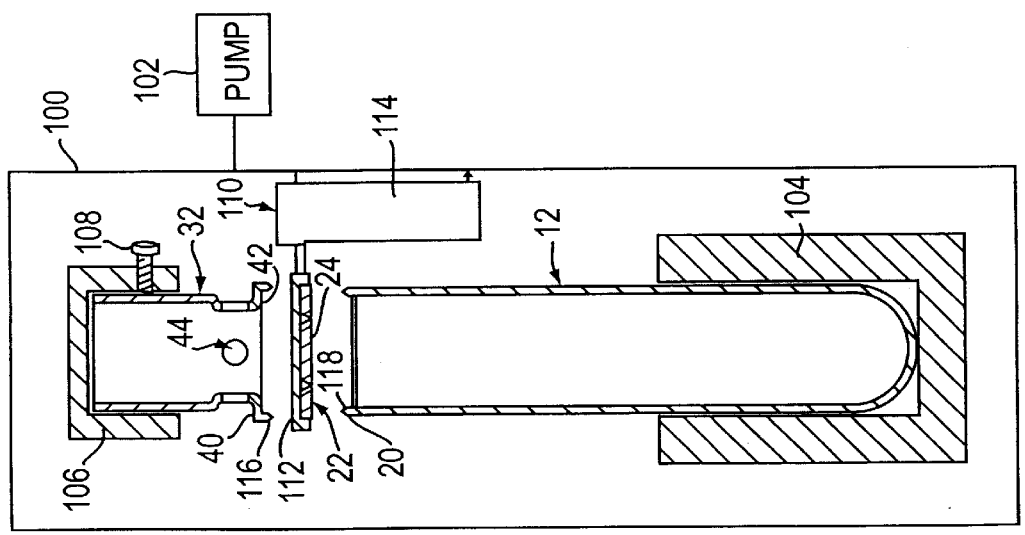

In FIG. 5, the completed weld is shown. At this point, the chamber 100 can be depressurized and the welded assembly removed from the chamber. The resultant weld is reliable and reduces the likelihood of leak paths developing in comparison with the prior art.

Figure 7:
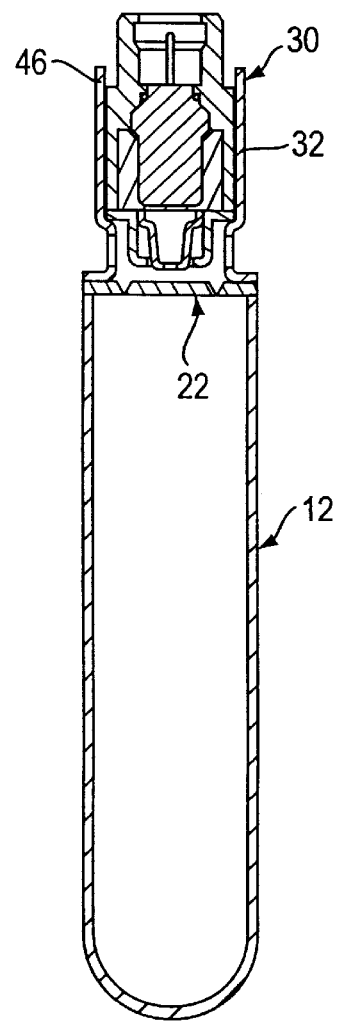
FIG. 7 is a longitudinal sectional view of the airbag inflator assembly manufactured in accordance with the principles of the present invention, immediately prior to the final assembly step.

In FIGS. 6 and 7, the piston housing 48, piston 56, foil 84 (which will be adhesively sealed to the annular edge 82 of the squib housing 74), generant 90, squib assembly 88, O-ring 98, and the squib housing 74 are shown in the arrangement in which they are assembled to form the ignitor assembly 30, as shown in FIG. 7. In the final step in the construction, the end 46 of the outer housing 32 is crimped radially inwardly to retain the elements of the ignitor assembly 30 within the housing 32, as will be apparent from FIG. 1.

Figure 8:
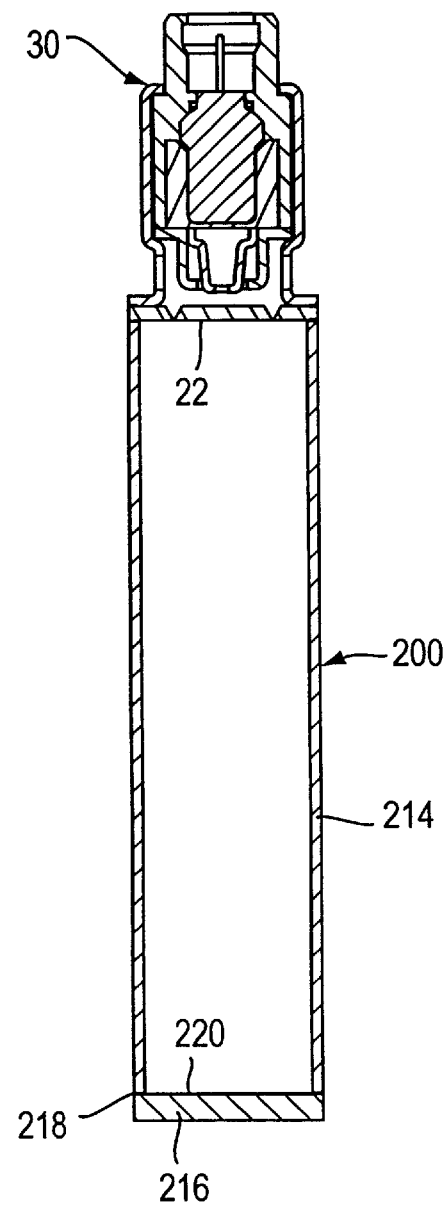
FIG. 8 is a longitudinal sectional view of another embodiment of the airbag inflator assembly manufactured in accordance with the principles of the present invention.

Shown in FIG. 8 is an alternative embodiment of the present invention. In this embodiment, it can be appreciated that the container 200 is not of a one-piece construction, but rather comprises a cylindrical wall portion 214, and a circular end wall portion 216 sealing off an end of the cylindrical wall portion 214 opposite the burst disc member 22. The cylindrical wall portion 214 has a peripheral surface or edge 218 which is welded to the periphery of a surface 220 on one side of the circular wall portion 216. Preferably, the surface 218 is welded to the periphery of surface 220 in a capacitive discharge operation similar to that described above.

It thus will be seen that the objects of this invention have been fully and effectively accomplished. It will be realized, however, that the foregoing preferred specific embodiments have been shown and described for the purpose of this invention and are subject to change without departure from such principles. Therefore, this invention includes all modifications encompassed within the spirit and scope of the following claims.

What is claimed is:

1. An airbag inflator assembly comprising:
    a container containing a charge of pressurized gas and having a peripheral surface surrounding an opening in the container;
    a burst disc member having a first side attached to the peripheral surface of the container by a first weld to seal the opening and thus confine the charge of pressurized gas within the container; and
    an ignitor assembly housing having a peripheral surface on an outwardly extending flange, the ignitor assembly including ignition elements constructed and arranged to generate sufficient force to break the seal formed by the burst disc member and release the pressurized gas from the container, the ignitor assembly being attached by a second weld to a second side of the burst disc opposite to the first side at the peripheral surface on the outwardly extending flange.

2. The airbag inflator assembly of claim wherein 1, the ignitor assembly further comprises a piston assembly.

3. The airbag inflator assembly of claim 1, wherein the ignitor assembly housing is roll-formed and has a generally constant wall thickness throughout its extent.

4. The airbag inflator assembly according to claim 3, wherein the burst disc member is formed as a metal stamping.

* * * * *